United States Patent [19]

Pearl, II

[11] 4,328,948
[45] May 11, 1982

[54] FLUID LINE COUPLING WITH SELF-ADJUSTING VALVE DEPRESSOR FOR REFRIGERATION REFRIGERANT TESTING AND CHARGING HOSES

[75] Inventor: David S. Pearl, II, Fort Lauderdale, Fla.

[73] Assignee: Uniweld Products, Incorporated, Fort Lauderdale, Fla.

[21] Appl. No.: 123,952

[22] Filed: Feb. 25, 1980

[51] Int. Cl.³ .................. F16L 37/10; F16L 37/28
[52] U.S. Cl. ........................... 251/149.6; 251/149.4
[58] Field of Search ............. 251/149.6, 149.7, 149.4

[56] References Cited

U.S. PATENT DOCUMENTS

| | | | |
|---|---|---|---|
| 2,322,462 | 6/1943 | Marquardt | 251/149.5 |
| 2,434,167 | 1/1948 | Knoblauch | 251/149.6 |
| 3,592,439 | 7/1971 | Ritchie, Jr. | 251/149.4 |
| 4,017,057 | 4/1977 | Strybel | 251/149.6 |
| 4,063,708 | 12/1977 | Smith | 251/149.6 X |
| 4,165,760 | 8/1979 | Guenther | 137/231 |
| 4,186,910 | 2/1980 | Higami | 251/149.6 |

*Primary Examiner*—William R. Cline
*Attorney, Agent, or Firm*—Hyman F. Glass; Leon J. Bercovitz

[57] ABSTRACT

A coupling for joining two fluid line members where one fluid line has an inflation valve and the other fluid line has a resilient material tubular sleeve with an axially self-adjusting splined valve depressor, for the inflation valve, tightly and securely positioned therein during fluid flow communication.

9 Claims, 7 Drawing Figures

FLUID LINE COUPLING WITH SELF-ADJUSTING VALVE DEPRESSOR FOR REFRIGERATION REFRIGERANT TESTING AND CHARGING HOSES

BACKGROUND OF THE INVENTION

1. Field of Invention

This invention relates to a fluid line coupling for refrigeration refrigerant testing and charging hoses where such coupling is provided with a valve depressor or valve opening element. Such hoses and the couplings are used with testing and charging manifolds for checking both the pressure and vacuum sides of refrigeration systems, and the couplings connect the testing hoses with the testing and charging lines of the refrigeration systems. The refrigeration system fluid or refrigerant lines have externally threaded valve nipples generally with inflation type, such as the so-called Schrader type (such as used in pneumatic tires), end valves. The couplings include, around the valve depressor or valve opening element, internally threaded sleeves for engagement with such nipples. As the internally threaded sleeve threadedly engages the valve nipple, the valve depressor or valve opening element contacts and then depresses the inflation valve stem from its closed position to its open position to allow communication between the manifold and connected system line.

Heretofore, the servicemen, in using the testing and charging hoses, have found that the inflation valve stem does not terminate in such axial position as to make the desired complete contact with the valve depressor when the internally threaded sleeve is in sealed threaded engagement with the valve nipple or terminates in such axial position that it makes contact with and is depressed by the valve depressor or valve opening element before the internally threaded sleeve is in sealed threaded engagement with the valve nipple. In the former instance, no communication between the manifold and connected system line is made; in the latter instance, communication is made too soon and prior to sealing, with the resulting loss of fluid or refrigerant, 2. Description of the Prior Art Fluid line couplings are many in number.

In U.S. Pat. No. 2,322,462 (June 22, 1943), to Marquardt et al, is disclosed a coupling wherein there is an axially adjustable threaded valve depressor or valve opening element which is first threadedly positioned in its desired axial position and then fixed in such position.

Carlson, in U.S. Pat. No. 2,305,841 (Dec. 22, 1942), discloses a quick-disconnect fluid line coupling having a pair of coaxial body members detachably connected together, one of said members including an enlarged head thereon, a spring actuated valve in the other of said members, a spider and rod combination type valve depressor or valve opening element in said head, said element adapted to unseat said valve upon the uniting of said members, a resilient, for example, rubber, natural or synthetic, element engaging and retaining in position said spider portion of said valve depressor and the resilient member free end terminating in sealing relationship with the other of said members.

Coughlan, in U.S. Pat. No. 2,881,011 (Apr. 7, 1959), discloses a fluid line coupling having a pair of coaxial body members detachably connected, one of said members having a valve depressor and a sealing element and the other one of said members having a spring actuated valve.

In U.S. Pat. No. 3,592,439 (July 13, 1971), to Ritchie, is disclosed a fluid line coupling having a pair of coaxial body members detachably connected with a spring actuated valve in one of said members and an axially adjustable valve depressor or valve opening element in the other of said members. The Ritchie coupling valve depressor is positioned in a resilient sleeve and its body is threaded thereby to enable it to be axially adjustable in that sleeve by rotary turning and twisting movement. Once fixedly positioned in the sleeve, it is incapable of self-adjustment.

In "Simplified Training Course for Refrigerator Servicemen," Second Edition, Revised 1946, Nash-Kelvinator Corporation, 14250 Plymouth Road, Detroit, Michigan, on pages 133 and 137 thereof, is disclosed the concept of an adjusting screw threaded into a resilient sealing gasket in expansion valves used in refrigeration systems.

Jacobsson, in U.S. Pat. No. 2,662,348 (Dec. 15, 1953), discloses the combination of an axially adjustable threaded screw member and a phenolic condensation product sleeve, the latter threadedly engaging the former for rotation and axial movement with respect thereto.

British Pat. No. 572,183 (September 26, 1945), to Regent Autocar Company, Ltd., discloses fluid line couplings where there are valve depressors or valve opening elements having flat parallel opposing sidewalls.

Other prior art fluid couplings are disclosed by U.S. Pat. No. 1,423,873 (Newsom et al, July 25, 1922), U.S. Pat. No. 2,419,642 (Henry, Apr. 29, 1947), U.S. Pat. No. 2,504,569 (Murphy et al, Apr. 18, 1950), U.S. Pat. No. 2,665,928 (Omon et al, Jan. 12, 1954), U.S. Pat. No. 2,931,668 (Baley, Apr. 5, 1960), U.S. Pat. No. 3,448,779 (Horwitt, June 10, 1969) and French Pat. No. 867,500 (Imbrex S.A., Aug. 4, 1941).

SUMMARY OF THE INVENTION

In this invention, there is provided an axially self-adjusting valve depressor or valve opening element. The valve depressor is axially adjusted by the user, for example, the serviceman, prior to the joining of the coupling members, and is self-adjusting, as may be required, all without damage to its resilient material retaining sleeve. The valve depressor or valve opening element is retained in secured position in a resilient material, for example, black neoprene, tubular sleeve and includes a body portion with a passageway therethrough and an axially extending tip portion. This tip portion includes means for enabling the user to grip it easily with a gripping tool, for example, a pliers, and pull or push it, as may be necessary, and thusly axially adjust the valve depressor or valve opening element. The body portion has, on its outer surface, axially extending spline members extending into and in engagement with, at substantially the entire spline surface areas, the resilient tubular sleeve. The axially extending spline members are preferably symmetrical on preferably substantially the entire outer surface of the body portion. The valve depressor or valve opening element is securely held in position by said resilient material tubular sleeve. To adjust axially said valve opening element, it is required to pull or push it, at its tip portion, with a force overcoming the friction and force with which the resilient material of the tubular sleeve grips the spline members. The resilient tubular member and the valve depressor are positioned in the end portion of one, or a first, fluid line member to be coupled to another, or a second, fluid line member by a tubular coupling sleeve, preferably internally threaded and rotatably mounted on the first fluid line member.

The second fluid line member has a valve nipple at its end portion. This valve nipple is preferably externally threaded to receive the preferably internally threaded coupling sleeve in coupling said first and second fluid lines. Within the valve nipple is positioned an inflation type valve, for example, a Schrader type valve, including inwardly movable means, for example, an axially extending valve stem, for opening it to the flow of fluid therethrough and also including spring means for yieldably resisting the inward movement of the stem into said nipple.

The resilient material tubular sleeve also forms an annular seal against the end portion of the valve nipple when the first and second fluid lines are connected or coupled.

In use, the serviceman, after inspecting the inflation valve in the second fluid line to determine the position of the axially extending valve stem of said valve, pushes or pulls, with a gripping tool, the valve depressor or valve opening element to adjust it so that it extends approximately 0.0010" to 0.0015" more than is required for it to contact and push the inflation valve stem to open said valve to the flow of fluid therethough when the two fluid lines are in sealed connection and coupled securely. He then pulls the internally threaded tubular coupling means about the end portion of the first fluid line as far as it will go toward the externally threaded valve nipple at the end portion of the second fluid line and threads it onto the externally threaded nipple at the end portion of the second fluid line. The tubular coupling means is threaded onto the nipple in tight and secure engagement therewith in such manner that the resilient material tubular sleeve forms an annular seal against the end portion of said nipple and the valve opening element or valve depressor with its engaging and depressing means in engagement with the stem of the inflation valve self-adjusts itself when said first fluid line member and said valve nipple at the end portion of said second fluid line are tightly and securely connected for fluid communication therethrough. Irrespective of the axial position of the end of the valve stem of the inflation valve in the valve nipple, for example, whether it is protruding beyond the end of the nipple or is positioned within the nipple, only one initial adjustment of the valve depressor or valve opening element is required. Twisting and turning and threading with accompanying rotary movement of the valve depressor or valve opening element, as well as one or more additional adjustments, in the resilient material tubular sleeve, with resulting damage, as by cutting and tearing thereto, are unnecessary.

OBJECTS OF THE INVENTION

One of the objects of this invention is to provide a fluid line coupling with an axially self-adjusting valve depressor or valve opening element for refrigeration refrigerant testing and charging hoses wherein the valve depressor or valve opening element requires minimum preadjustment prior to coupling and is axially self-adjusting during the coupling of the fluid lines thereby connected.

Other objects and features will be readily apparent from the following detailed description, which is not limiting but only illustrative of the preferred embodiment of this invention.

DESCRIPTION OF THE PREFERRED EMBODIMENT

Figure 1:
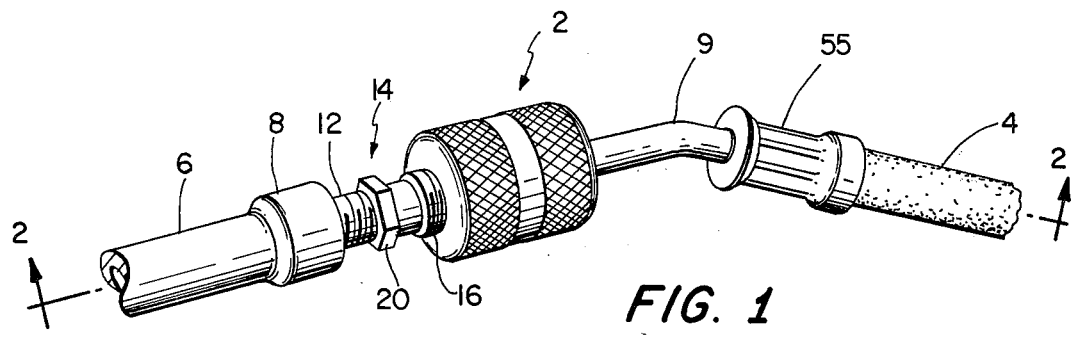
FIG. 1 is a perspective view of the fluid line coupling after the joining or connecting of the end of the first fluid line member to the end of the second fluid line member for passage of refrigerant fluid through said first line, said coupling and said second line.

Elements or groups of elements, such as refrigerant and testing manifolds, which are conventional and generally widely known in the field and with which this invention is used, are not here described in detail as to their exact nature and type for the reason the person of ordinary skill in the art can understand and use same without a detailed recitation of such conventional and generally widely known elements or groups of elements.

More particularly, coupling 2 connects hose or fluid line 4 on a refrigerant fluid testing and charging manifold (not shown) to fluid line 6, a charging line for admission of refrigerant fluid to a refrigeration system (not shown).

Fluid line 6 has an enlarged internally threaded coupling sleeve 8 at its end portion and passageway 10 therethrough. Externally threaded end portion 12 of valve nipple 14 is threaded into coupling sleeve 8 in tight and secure relationship therewith. Externally threaded end portion 16 of valve nipple 14 is separated from end portion 12 by valve nipple nut portion 20 for receiving a wrench with which to securely thread end portion 12 into coupling sleeve 8. Valve nipple 14 has therethrough passageway 18 in communication with passageway 10 of fluid line 6. Positioned in passageway 18 and blocking passageway 18 of valve nipple 14 and passageway 10 of fluid line 6 is inflation valve 22. Inflation valve 22 includes spring biased valve stem 24 and collar 26 threaded at its head portion 36 for threaded engagement with the portion of internally threaded end portion 16. Collar 26 is connected to elongated sleeve 28 which slidably holds valve stem 24 carrying disc 30 on its end portion for closing and sealing end 32 of sleeve 28. Spring 34 is positioned about valve stem 24 within sleeve 28 for yieldingly resisting inward movement of stem 24 and yieldingly retaining disc 30 in closed position against sleeve 28. Collar 26 has side portions cut away and provides head portion 36. Head portion 36 has opposing side ports 38 for communication with interior of sleeve 28.

Fluid line or hose 4 has a ferrule 55 at its end portion keeping in fixed position three-step hose barb tubular insert member 1 in its passageway 3. Said tubular insert member 1 terminates in an enlarged cup portion 5. Passageway 7 of tubular insert member 1 communicates with passageway 3 of fluid line or hose 4. Said tubular insert member 1 has elbow-shaped portion 9 between the barbed portion and the cup portion 5. Said cup portion 5 includes frustoconically shaped portion 11, cylindrically shaped portion 13 and then smaller cylindrically shaped portion 15 adjacent to and contiguous with passageway 7. Squeeze fitted into frustoconically shaped portion 11 and cylindrically shaped portion 13 of cup portion 5 is resilient material tubular sleeve 17 with approximately 1/5 to 1/6 of it extending beyond the end of cup portion 5 into annular sealing relationship with valve nipple 14 at the end 19 of externally threaded end portion 16. Smaller cylindrically shaped portion 15 of cup 5 terminates in annular shoulder 21. Squeeze fitted into and tightly and securely positioned in resilient material tubular sleeve 17 is axially self-adjusting valve-opening element or valve depressor 23. Valve depressor 23 includes body portion 25 having passageway 27 therethrough and axially extending symmetrical spline members 29 on its entire outer surface 31. Spline members 29, at their entire surface areas, extend into and in engagement with resilient material tubular sleeve 17. Integral with and axially extending from said body portion 25 is tip portion 33. Tip portion 33 has sidewalls 35 tapering from the body portion wall 37 to face 39 with recess 41 therein, flat parallel walls 43 for receiving a gripping tool, for example, a pliers, and openings 45. The axial length of body portion 25 is less than the axial length of resilient material tubular sleeve 17. However, the axial length of body portion 25 can be the same or greater than the axial length of resilient material tubular sleeve 17. The outer diameter of splined body portion 25 of valve opening element or valve depressor 23 is less than the diameter of smaller cylindrically shaped portion 15 of cup 5. The inside diameter of splined body portion 25 of valve depressor 23 is approximately the same as the diameter of passageway 7 of member 1. Annular shoulder 21 acts as a stop, as is clearly apparent, for valve depressor 23 in the event that valve depressor 23 is ever pushed inwardly with too much force. Rotatably mounted on and about enlarged cup portion 5 of insert member 1 is tubular coupling sleeve 47 with internally threaded inner surface 49 for threaded engagement with externally threaded end portion 16 of valve nipple 14.

Figure 2:
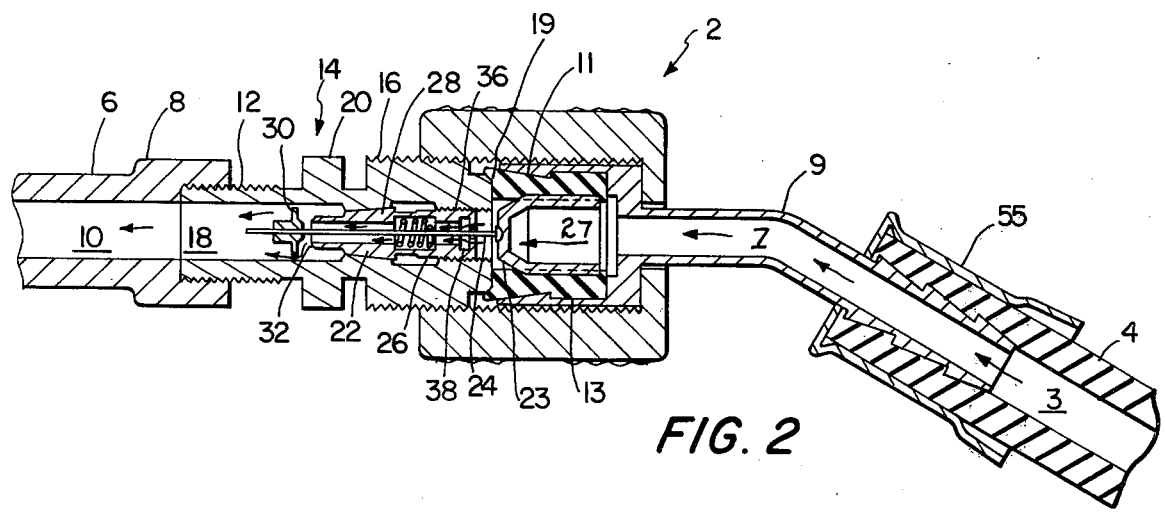
FIG. 2 is a cross-sectional view taken on line 2—2 of FIG. 1.
Figure 3:
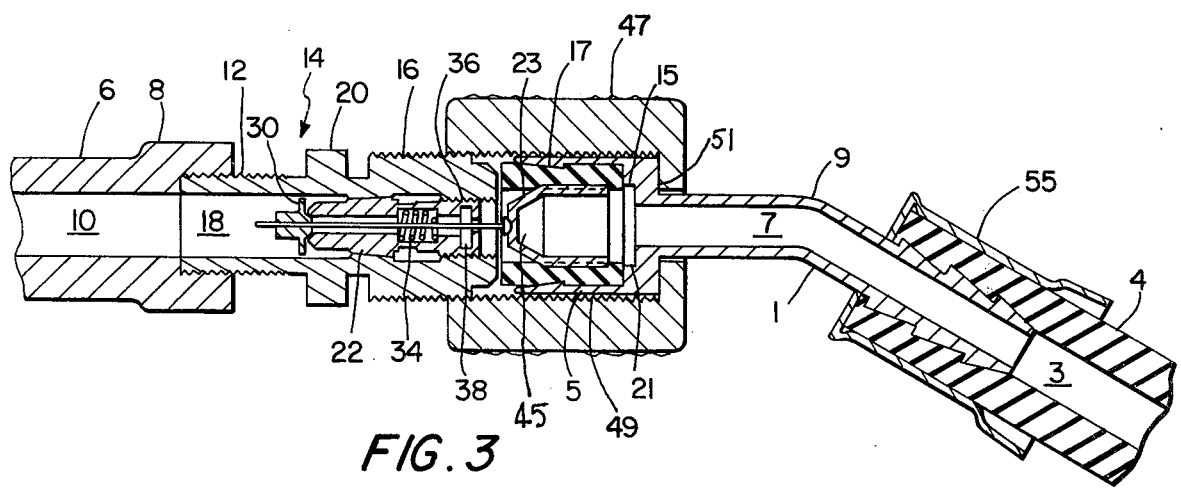
FIG. 3 is a cross-sectional view similar to that of FIG. 2 but showing the valve depressor or valve opening element at its first contact with the stem of the inflation valve and just prior to its self-adjustment.
Figure 4:
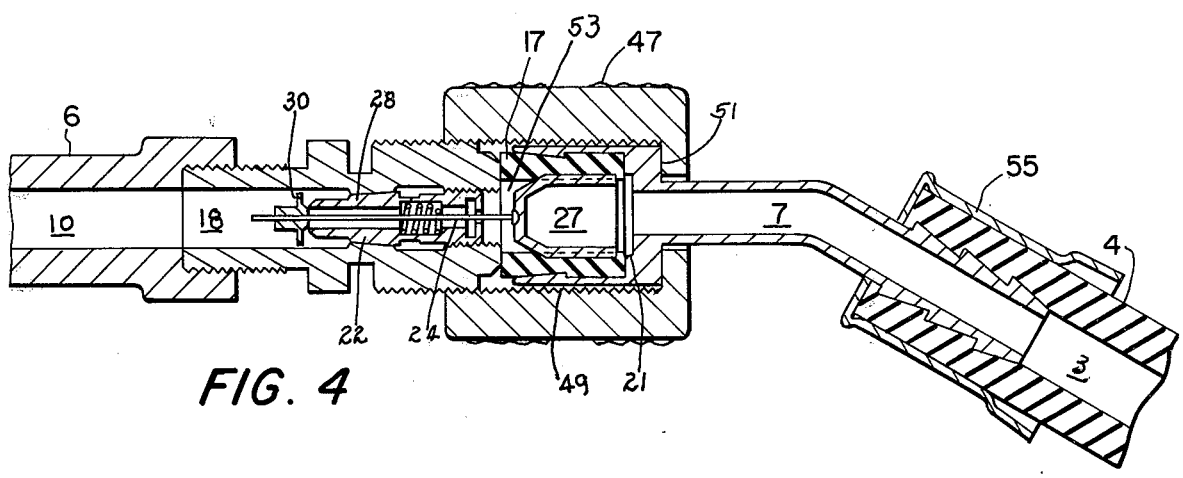
FIG. 4 is a cross-sectional view similar to that of FIGS. 2 and 3 but showing the valve depressor or valve opening element after its self-adjustment.
Figure 5:
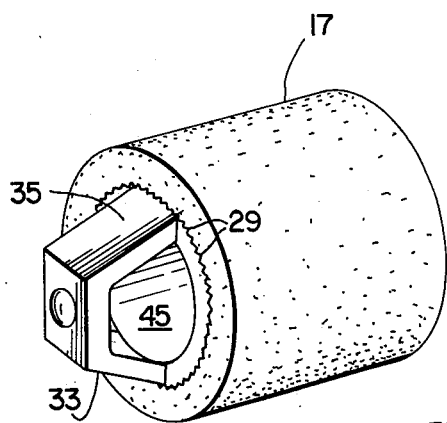
FIG. 5 is a perspective view of the valve depressor or valve opening element positioned in the resilient material tubular sleeve.
Figure 6:
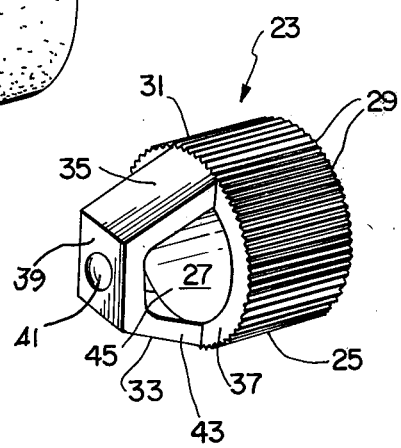
FIG. 6 is a perspective view of the valve depressor or valve opening element.
Figure 7:
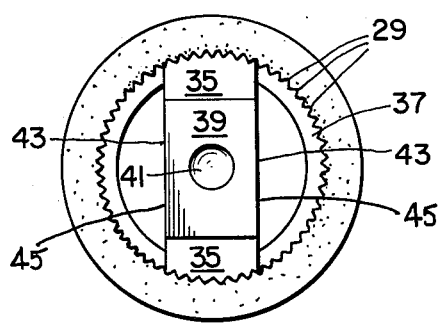
FIG. 7 is a front view of the valve depressor or valve opening element positioned in the resilient material tubular sleeve.

In use, when the spring biased inflation valve stem 24 is positioned as shown in FIG. 3, valve depressor 23 is gripped with a gripping tool, for example, pliers, at the flat parallel walls 43 of axially extending tip portion 33 and pushed into resilient material tubular sleeve 17, placing it in position shown in FIG. 3. Internally threaded tubular coupling sleeve 47 is pulled axially, until it is stopped by shoulder 51, toward externally threaded end portion 16 of valve nipple 14. Then, threading of tubular coupling sleeve 47 onto externally threaded end portion 16 is begun, tip portion 33 of valve depressor 23 with recess 41 in face 39 contacts spring biased valve stem 24 of inflation valve 22 and end portion 16 of valve nipple 14 engages resilient material tubular sleeve 17 as valve depressor 23 self-adjusts itself in resilient material tubular sleeve 17, to assume the positions shown in FIG. 4. Tubular coupling sleeve 47 is threaded further onto externally threaded end portion 16 of valve nipple 14 in tight and secure engagement therewith and end portion 16 of valve nipple 14 forms an annular seal with resilient material tubular sleeve 17. Disc 30 of inflation valve 22 is completely unseated from end 32 of sleeve 28, as shown in FIG. 2, and communication is established through passageway 3 of fluid line 4, passageway 7 of insert member 1, passageway 53 of resilient material tubular sleeve 17, passageway 27 of body portion 25 of valve depressor 23, openings 45, passageway 18 of valve nipple 14, side ports 38 of head portion 36 of inflation valve 22, collar 26, elongated sleeve 28, end 32 of sleeve 28, passageway 18, and passageway 10 of fluid line 6 with refrigerant fluid flowing in the direction of arrows, as shown in FIG. 2. During the refrigerant fluid flow at the same pressures, the valve depressor 23 is tightly and securely positioned in resilient material tubular sleeve 17.

Many alterations and changes may be made without departing from the spirt and scope of this invention which is set forth in the appended claims which are to be construed as broadly as possible in view of the prior art.

What is claimed is:

1. In a coupling for joining the end of a first fluid line member to the end of a second fluid line member, said second fluid line member including at its end portion a valve nipple, a valve positioned in said valve nipple, said valve including inwardly movable means for opening it to the flow of fluid therethrough and through said second fluid line member and also including means for yieldably resisting the inward movement of said opening means into said nipple, tubular coupling means at the end portion of said first fluid line member for connecting said first fluid line member and said valve nipple of said second fluid line member, an axially self-adjusting valve opening element including a body portion having a passageway therethrough and axially extending spline members on its outer surface and means for engaging and depressing said valve opening means inwardly into said nipple against said valve means for yieldably resisting the inward movement of said valve opening means when said first fluid line member and said valve nipple are connected, resilient material tubular sleeve means mounted concentrically within said tubular coupling means both for forming an annular seal against the end portion of said valve nipple and for retaining said axially self-adjusting valve opening element in position, said axially extending spline members on the outer surface of said valve opening element body portion extending into and in engagement with the resilient material tubular sleeve means, while allowing axial adjustment of said self-adjusting valve opening element and its engaging and depressing means in engagement with said valve opening means when said first fluid line member and said valve nipple are connected.

2. In the coupling of claim 1 wherein the resilient material tubular sleeve means is positioned in the end portion of said first fluid line member.

3. In the coupling of claim 1 wherein the inwardly movable valve opening means includes an axially extending valve stem and the means for yieldably resisting the inward movement of said stem is a spring member.

4. In the coupling of claim 1 wherein said self-adjusting valve opening element axially extending spline portions extend into and in engagement with, at substantially their entire surface areas, said resilient material tubular sleeve means, and said self-adjusting valve opening element includes an axially extending tip portion for engagement with and depressing said inwardly movable valve opening means.

5. In the coupling of claim 1 wherein the inwardly movable valve opening means includes an axially extending, inwardly movable valve stem, the means for yieldably resisting the inward movement of said stem is a spring member, said valve opening element axially extending spline portions extend into and in engagement, at substantially their entire surface areas, with said resilient material tubular sleeve means, and said valve opening element includes an axially extending tip portion for engagement with and depression of said inwardly movable, axially extending valve stem.

6. In the coupling of claim 5 wherein said axially extending spline portions are symmetrical on substantially the entire outer surface of said body portion.

7. In the coupling of claim 5 wherein said axially extending tip portion includes means for enabling gripping of it.

8. In the coupling of claim 5 wherein said resilient material tubular sleeve means is positioned in the end portion of said first fluid line member.

9. In the coupling of claim 5 wherein said axially extending spline portions are symmetrical on substantially the entire outer surface of said body portion, said axially extending tip portion includes means for enabling gripping of it, and said resilient material tubular sleeve means is positioned in the end portion of said first fluid line member.

* * * * *